April 18, 1961 W. M. SHOOK 2,979,908
HYDRAULIC CONTROL SYSTEMS
Filed Jan. 4, 1960 5 Sheets-Sheet 1
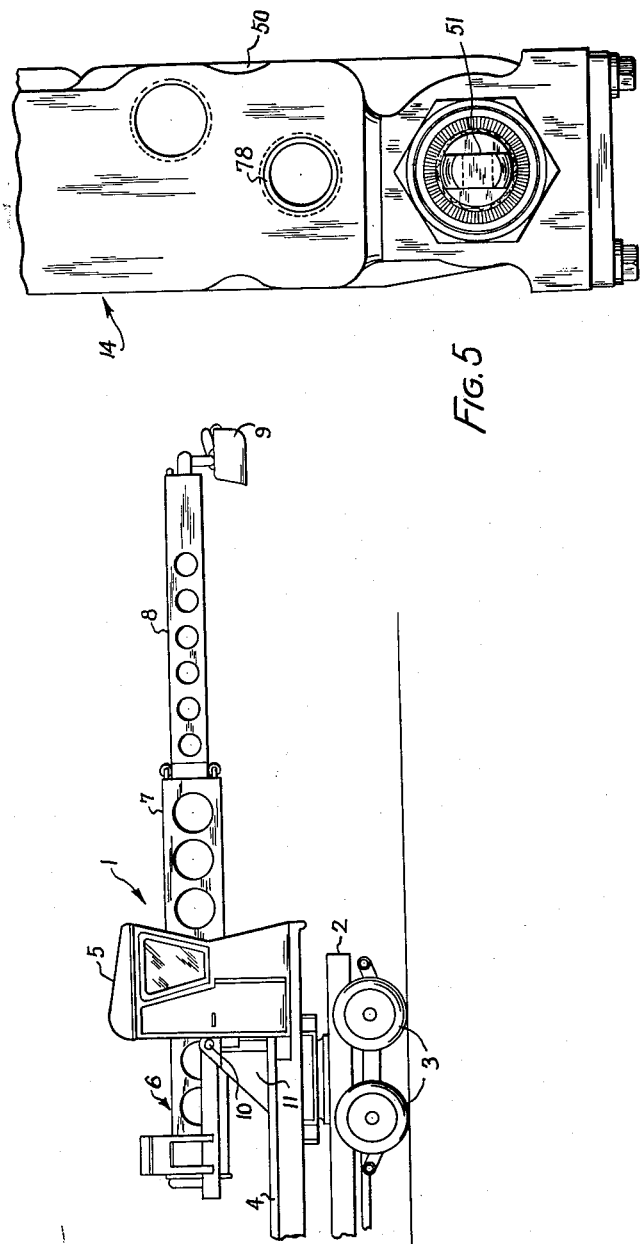
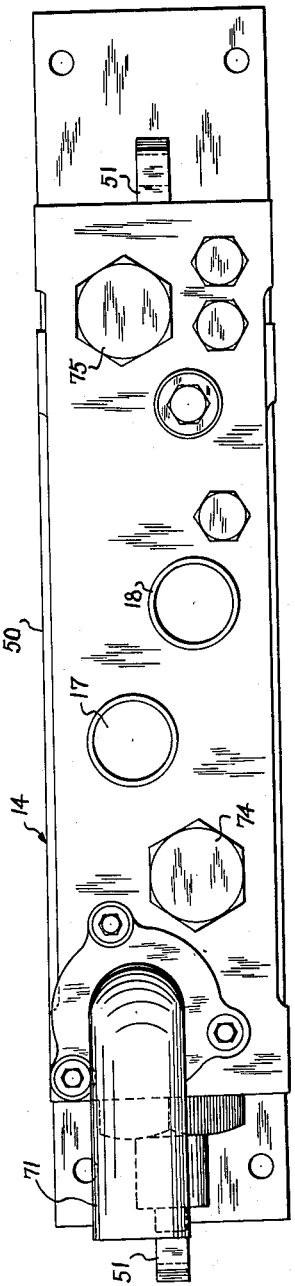
INVENTOR.
WILLIAM M. SHOOK
BY Hudson, Boughton,
Williams, David & Hoffmann
ATTORNEYS April 18, 1961 W. M. SHOOK 2,979,908
HYDRAULIC CONTROL SYSTEMS
Filed Jan. 4, 1960 5 Sheets-Sheet 2
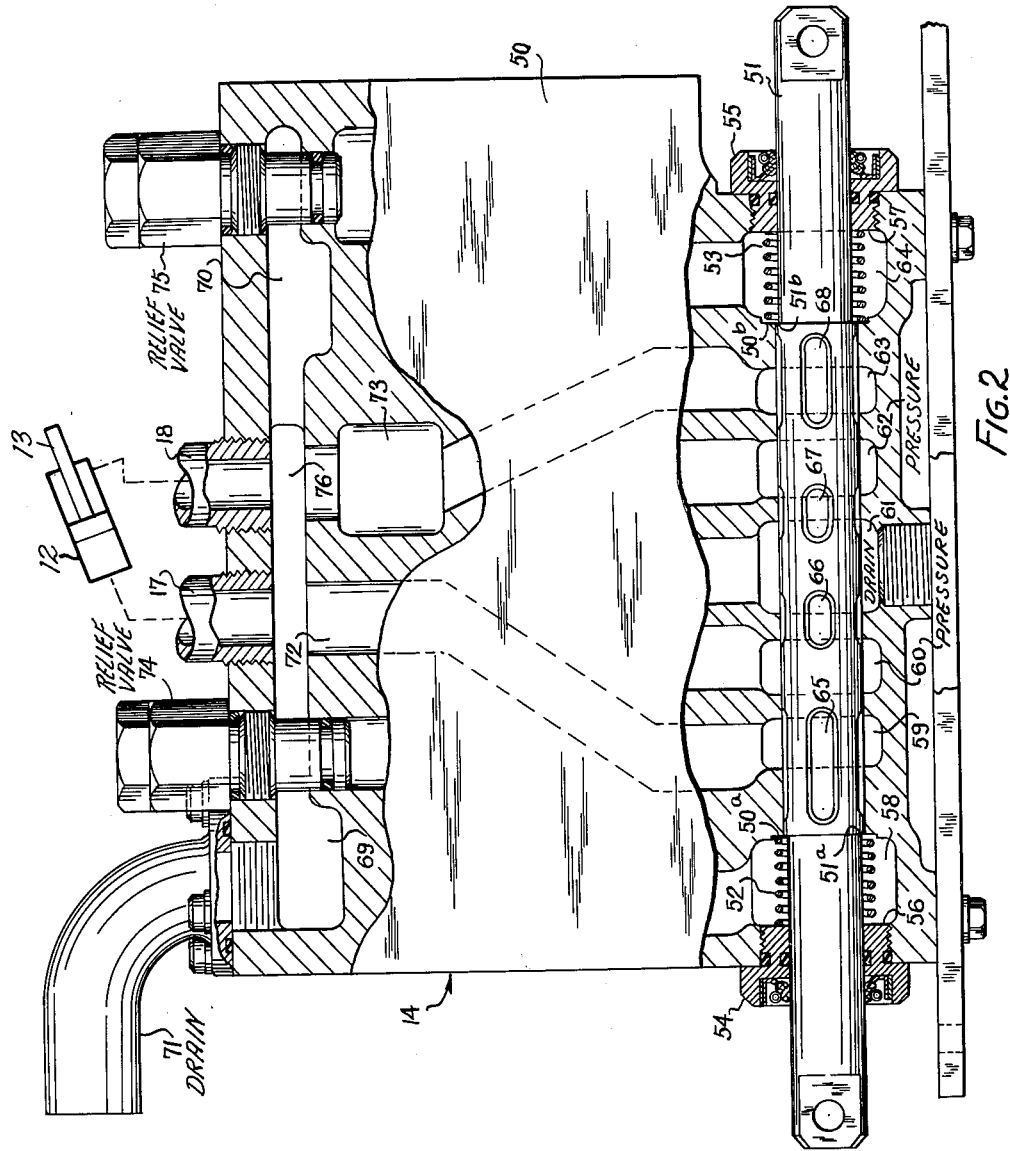
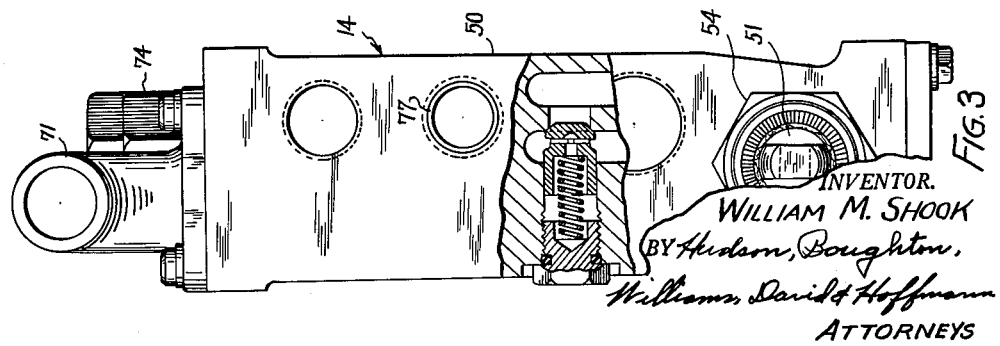
INVENTOR.
WILLIAM M. SHOOK
BY Hudson, Boughton,
Williams, David & Hoffmann
ATTORNEYS

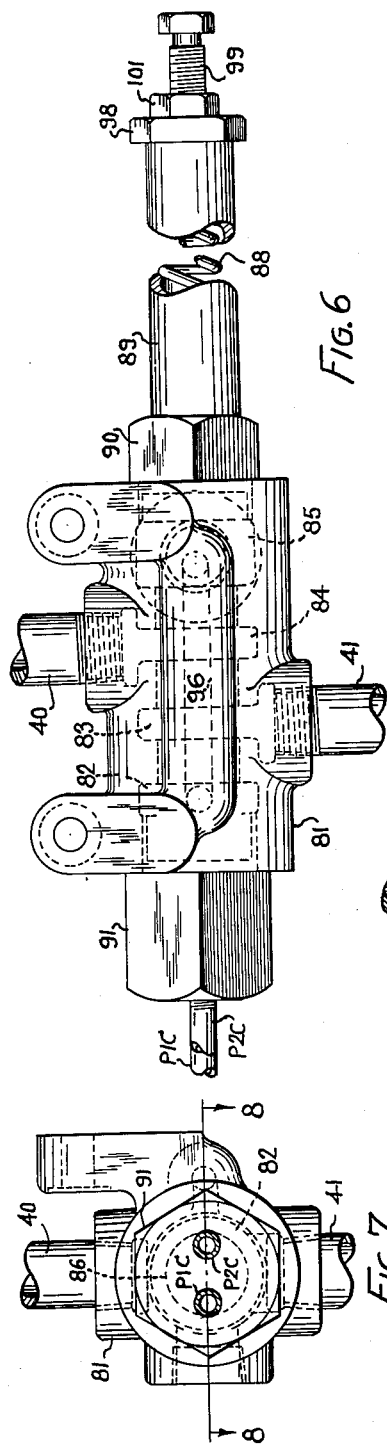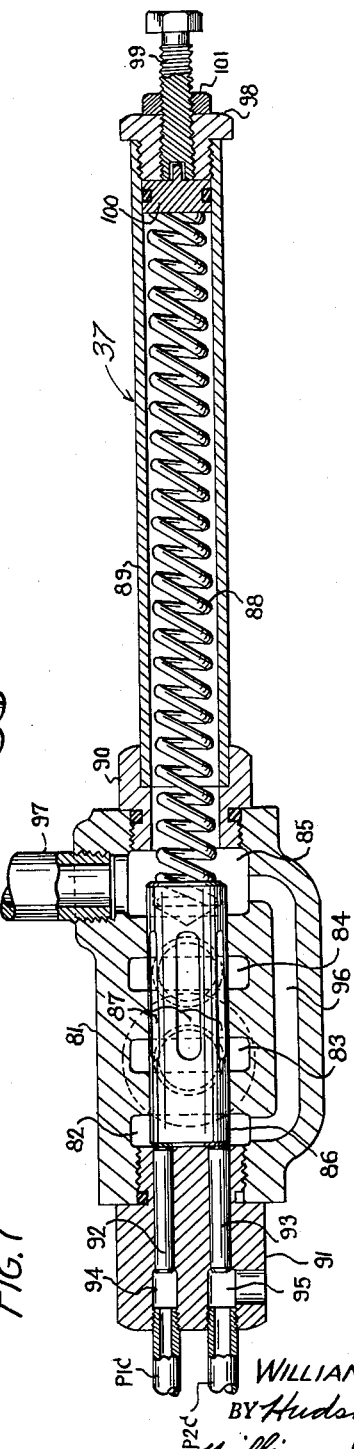

April 18, 1961 W. M. SHOOK 2,979,908
HYDRAULIC CONTROL SYSTEMS
Filed Jan. 4, 1960 5 Sheets-Sheet 4
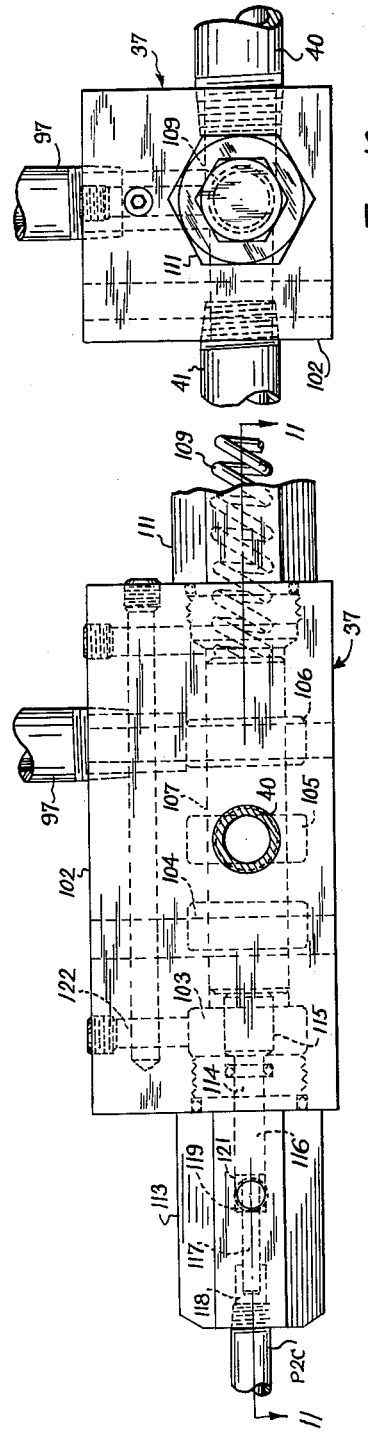
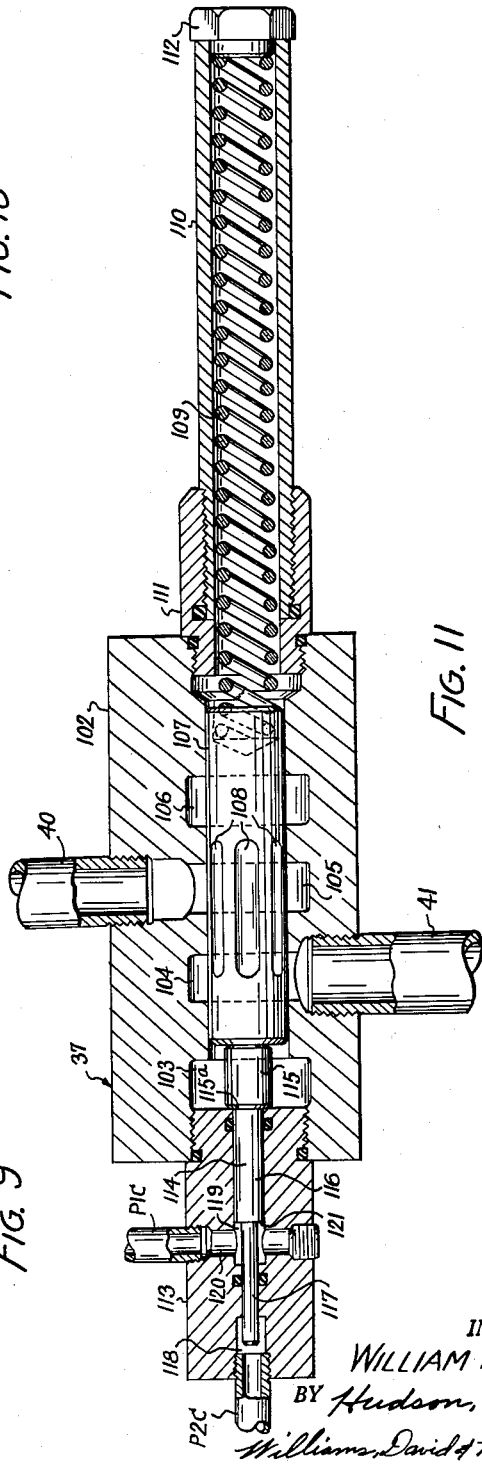
INVENTOR.
WILLIAM M. SHOOK
BY Hudson, Boughton,
Williams, David & Hoffmann
ATTORNEYS

# United States Patent Office 2,979,908
Patented Apr. 18, 1961

2,979,908

HYDRAULIC CONTROL SYSTEMS

William M. Shook, New Philadelphia, Ohio, assignor to
The Warner & Swasey Company, Cleveland, Ohio, a
corporation of Ohio Filed Jan. 4, 1960, Ser. No. 133

11 Claims. (Cl. 60—97)

This invention relates to hydraulic control systems and particularly to hydraulic systems for controlling actuation of a hydraulically actuated device.

According to the present invention a hydraulic control system of improved construction is provided for automatically controlling actuation of a hydraulically actuated device such as a fluid actuated motor. The present invention provides a hydraulic control system wherein pressure fluid is automatically supplied to a fluid actuated device from a source other than the source normally supplying the device when the pressure of the normal source attains a preselected value. The system includes a control valve actuatable automatically to direct fluid to the device from a source other than the source normally supplying the device when the device cannot be properly actuated from its source due to excessive power requirements of the device. The term "power requirements" as employed herein refers to the volume of pressure fluid required to be supplied to the fluid actuated device to maintain a predetermined fluid pressure on the device for actuating the device at a predetermined speed.

Although the present invention has many and varied uses it is described herein as employed for operating a boom utilized in material handling apparatus such as an earth working machine. In conventional machines of this type the boom includes two or more boom sections which are telescopically arranged with respect to one another. The boom is also mounted for rotation about a vertical axis and is further designed to be tilted about a horizontal axis. A plurality of fluid actuated motors are provided, each for effecting a separate movement of the boom. As an example, a fluid motor is provided to effect the telescoping movement of the boom. Additional fluid motors are also provided for effecting the rotation or swing of the boom and the tilting thereof. Each of these motors is supplied with pressure fluid from a separate pump under control of a plurality of valves which may be designated as tilt, swing, and boom valves.

The hydraulic control system includes a control valve which is automatically actuatable when one of the pumps is incapable of supplying sufficient pressure fluid to its associated motor to effect proper operation of the motor due to excessive power requirements of the motor. The control valve is designed so that when it is actuated fluid is supplied from one of the other pumps to the motor to supplement the fluid supply to this motor from its pump. The arrangement is such that the control valve directs fluid from another pump only when such other pump is not supplying fluid to its associated motor.

The invention further provides that one valve of the plurality of valves is arranged to direct fluid from its pump to a motor which is supplied from another pump. This valve is effective to direct fluid only when it is in a neutral condition and is not supplying fluid to its associated motor. The control valve is actuated automatically to direct additional fluid to the motor from a third pump when the fluid supply to the motor from the other two pumps cannot supply the power requirements of the motor.

In the preferred embodiment of the invention the control valve is connected to receive fluid from the tilt motor pump to direct the received fluid to the boom motor when the boom motor pump cannot properly operate the boom motor. The control valve receives fluid from the tilt valve only when the tilt valve is in a neutral condition and the tilt motor is therefore not operating. The swing valve is arranged to direct fluid from the swing motor pump to the boom motor when the swing valve is in a neutral condition and the swing motor is not operating. The control valve is actuated under the control of the boom motor pump and the swing motor pump. When these two pumps together cannot supply the power requirements of the boom motor the control valve is automatically actuated to direct fluid to the boom motor from the tilt motor pump so as to supplement the fluid supplied to the boom motor by the other two pumps.

It is therefore an object of the invention to provide an improved hydraulic control system for automatically controlling actuation of a hydraulically actuated device.

It is a further object of the invention to provide a hydraulic control system for automatically supplying additional fluid to a hydraulically actuated device when the pressure fluid source for such device is incapable of supplying the power requirements of the device.

It is still another object of the invention to provide a hydraulic control system for automatically directing fluid to a hydraulically actuated motor when the pressure of a pump normally employed to supply the motor is decreased below a preselected value.

It is another object of the invention to provide a hydraulic control system including a plurality of hydraulically actuated devices and a plurality of pressure fluid sources and means for automatically supplying additional fluid to one of the devices from a source other than the source for the one device when the power requirements of the device cannot be supplied by its source and when the other source is not actuating its device.

It is a further object of the invention to provide a hydraulic control system including a hydraulically actuated motor and a valve actuatable for directing additional fluid to the motor from a pressure fluid source other than the source normally supplying the motor when the normal source is incapable of supplying the power requirements of the motor.

It is a still further object of the invention to provide an improved hydraulic control system for controlling movements of a boom in material handling apparatus.

Other objects of the invention will become apparent from the following description taken in conjunction with the accompanying drawings, in which:

Fig. 1 is a view in elevation of a material handling machine embodying the teachings of the present invention;

Fig. 2 is a view in elevation with parts shown in section and with parts removed illustrating a valve for controlling the directing of fluid from a fluid source to a fluid actuated device;

Fig. 3 is a view in end elevation of the valve of Fig. 2 taken at the left end with parts shown in section and with parts broken away;

Fig. 4 is a view in top plan of the valve shown in Fig. 2;

Fig. 5 is a view in end elevation of the valve of Fig. 2 taken at the right end;

Fig. 6 is a view in side elevation of a control valve employed in the present invention;

Fig. 7 is a view in end elevation of the control valve of Fig. 6;

Fig. 8 is a view in section taken along the line 8—8 of Fig. 7;

Fig. 9 is a view in side elevation with parts broken away of a control valve of different construction than the valve shown in Figs. 6, 7 and 8;

Fig. 10 is a view in end elevation of the valve of Fig. 9;

Fig. 11 is a view in section taken along the line 11—11 of Fig. 9; and

Figure 12:
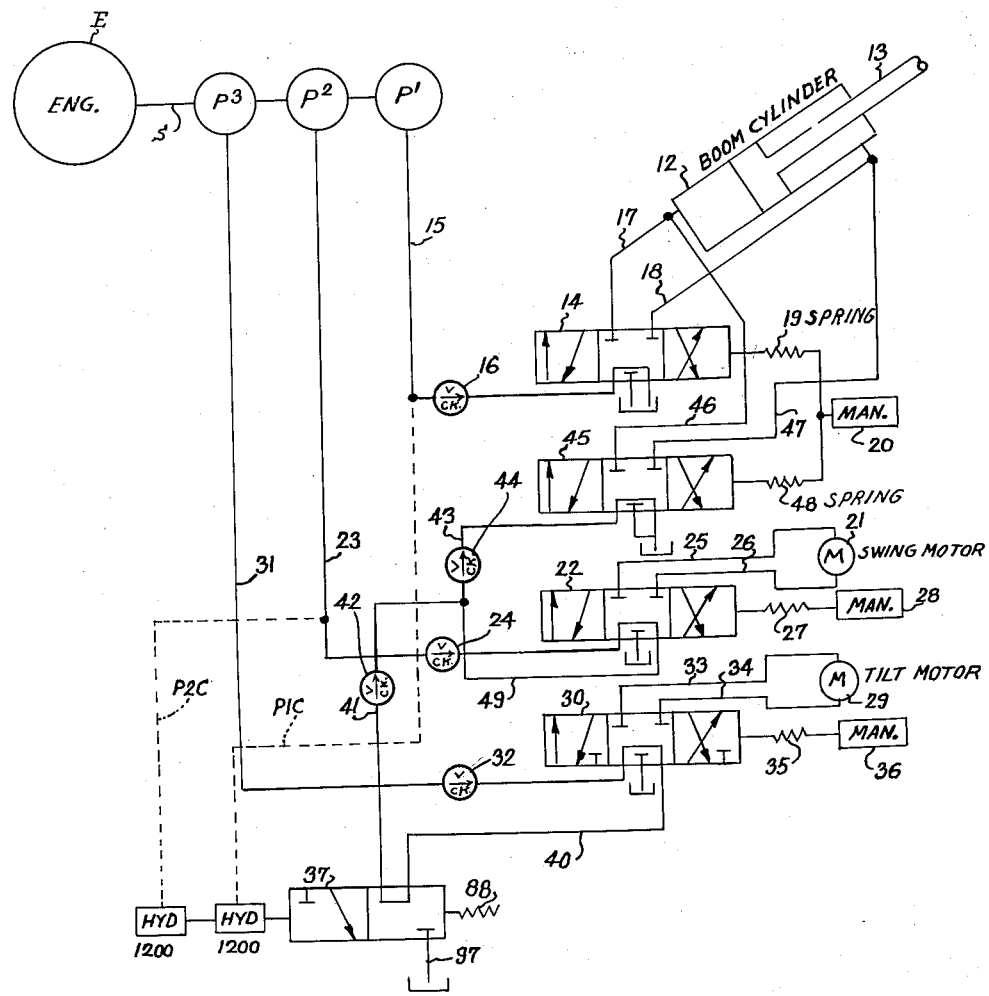
Fig. 12 is a diagrammatic representation of a hydraulic control system embodying the teachings of the present invention.

The hydraulic control system of the present invention may be employed in connection with a variety of hydraulically operated devices and will be described in association with an earth working machine for controlling the various movements of a boom utilized in the machine.

Referring now to the drawings, there is illustrated in Fig. 1 an earth working machine of the mobile type represented generally by the numeral 1 and including a chassis 2 supported by a plurality of rotatable wheels 3. The chassis 2 rotatably supports a turntable 4 to which is secured an operator's cab 5 and a boom structure 6 on one side of the cab 5.

The boom structure 6 includes a pair of telescopically arranged boom sections 7 and 8 with the section 8 having attached thereto at its outer end a tool or implement 9. The boom 6 is mounted for pivotal movement about a horizontal axis by a pivotal connection 10 between the section 7 and an upright 11 secured to the turntable so that the tool 9 may be elevated and lowered. It is thus seen that the boom 6 is movable in a number of directions so that the tool 9 may be readily moved to a number of positions.

In order to effect movement of the boom 6 a plurality of motors of the fluid actuated type are provided. A fluid motor is provided for effecting telescopic movement of the boom section 8 relative to the section 7, and as shown in Fig. 12, is in the form of a fluid cylinder 12 containing a piston 13 which is operatively connected to the boom section 8. The piston 13 is slidable within the cylinder 12 in response to the application of pressure fluid to the cylinder through a valve 14 from a source of pressure fluid in the form of a conventional fluid pump P1 connected to the valve 14 by a conduit 15 having a check valve 16. The valve 14 will be designated hereinafter as a boom valve and as will presently appear, includes a valve body shiftable between a plurality of positions wherein pressure fluid may be selectively supplied to the cylinder 12 through conduits 17 and 18. The valve 14 may be manually shiftable under the control of spring means 19 by a suitable manual control 20 such as a hand lever.

The boom is rotated about a vertical axis by actuation of a swing motor 21 which may be of the rotary type and which is effective when rotated to rotate the turntable 4. The motor 21 is supplied with pressure fluid through a swing valve 22 from a conventional fluid pump P2 which is connected to the valve 22 by a conduit 23 having a check valve 24. The valve 22 includes a shiftable body for selectively controlling the flow of fluid to the motor 21 through conduits 25 and 26. The valve 22 is actuated under the control of spring means 27 by manually actuated means 28 such as a hand lever. Although the motor 21 is shown as being of the rotary type, it may take the form of a cylinder and piston, if desired.

In order to effect tilting movement of the boom about a horizontal axis, a tilt motor 29 which may also be of the rotary type is provided and is supplied with pressure fluid from a fluid pump P3 under the control of a tilt valve 30 connected to the pump P3 by a conduit 31 having a check valve 32. The valve 30 includes a shiftable body to selectively control the flow of fluid to the motor 29 through conduits 33 and 34. Spring means 35 controls movement of the valve body when the body is shifted by manually actuatable means 36 such as a hand lever.

The pumps P1, P2 and P3 may be of the rotary type and are operated from a common shaft S which is driven from an engine E. The engine E may be a gas engine and conveniently is the engine utilized to power the mobile earth working machine.

It is apparent that by operating the several valves 14, 22 and 30 the boom may be telescoped, rotated and tilted as desired. For example, the boom section 8 may be extended outwardly relative to the section 7 by shifting the body of the valve 14 from its illustrated neutral position to the right as viewed in Fig. 12, so that fluid is supplied through the conduit 17 to the cylinder beneath the piston head to force the piston 13 outwardly of the cylinder. If it is desired to retract the section 8, the body of the valve 14 is shifted to the left from its neutral position shown in Fig. 12 so that fluid is supplied to the cylinder through the conduit 18. In a similar manner the swing motor 21 may be rotated in opposite directions to effect opposite directions of rotation of the boom about a vertical axis by shifting the body of the valve 22 to the right or left from the neutral position shown in Fig. 12. The boom may be tilted in opposite directions about a horizontal axis by shifting the body of the valve 30 from its illustrated neutral position to either the right or left to direct fluid to the motor 29 through either the conduit 33 or the conduit 34, as desired.

When controlling fluid actuated devices, such as motors for operating a boom in an earth working machine, a situation may arise when the fluid source or pump associated with a particular one of the motors is incapable of supplying the power requirements of the motor. In the present invention means are provided for automatically supplying pressure fluid to a fluid actuated device such as a motor when the source or pump for the motor is incapable of supplying the power requirements of the motor. The additional fluid which is automatically supplied to the motor is added to the existing supplied fluid and may be supplied from a source or pump other than the pump which is normally supplying the motor. The invention provides that the additional fluid can be supplied from another pump only when that other pump is not supplying fluid to its associated motor. The invention further provides that fluid is automatically supplied to the motor from a third source in the event that the normal source for the motor and an additional source are both incapable of supplying the power requirements of the motor.

The hydraulic system of the present invention includes a control valve which is automatically actuatable to direct fluid to one of the motors from a pump other than the pump associated with one motor. In the embodiment illustrated in Fig. 12, a control valve 37, which will be designated hereinafter as a diversion valve, is automatically actuatable to direct fluid from the pump P3 to the cylinder 12 when the pump P1 cannot supply the power requirements of the motor including the cylinder 12 and the piston 13. It is to be understood that the valve 37 may be associated with any of the several pumps to direct fluid to any of the motors when the pump for a particular motor cannot supply the power requirements of the motor. As will be described more fully hereinafter, the valve 37 is actuated to direct fluid from the pump P3 to the cylinder 12 in response to predetermined pressure conditions of the pumps P1 and P2.

The construction and operation of the valve 37 will be described hereinafter and is such that when the valve is actuated fluid flows from the pump P3 through the conduit 31, the valve 32, the tilt valve 30, a conduit 40, the valve 37, a conduit 41, a check valve 42, a conduit 43, a check valve 44, and to the cylinder 12 through an additional control valve 45 which controls the direction of fluid to the cylinder 12 through conduits 46 and 47. The body of the valve 45 is operatively connected to the body of the valve 14 and is shiftable therewith by operation of the manual means 20 under the control of spring means 48.

The valve 37 receives fluid from the pump P3 through the conduit 40 only when the valve 30 is in a neutral condition wherein fluid cannot be supplied to the tilt motor 29. As a result of this arrangement the valve 37 is effective to direct fluid from the pump P3 only when the tilt motor is not being actuated by fluid from the pump P3.

The present invention also provides that fluid may be supplied to a motor such as the cylinder 12 and piston 13 from a source other than the sources associated with the valve 37 and with the motor. As shown in Fig. 12, fluid may also be supplied to the cylinder 12 from the pump P2 which supplies the swing motor 21. For this purpose the swing valve 22 is connected to a conduit 49, which in turn is connected to the conduit 43 leading to the valve 45. The conduit 49 is connected to the conduit 23 and the pump P2 only when the valve 22 is in a neutral position and therefore fluid from the pump P2 is supplied to the cylinder 12 only when the swing motor 21 is not receiving fluid from the pump P2.

The valves 14, 22, 30 and 45 may be of similar construction and therefore only one of the valves need be described in detail and for this purpose the boom valve 14 will be described. Referring now to Fig. 2, the valve 14 includes a housing 50 having a cylindrical bore therethrough in which is slidably positioned a plunger 51. The plunger is shiftable relative to the housing 50 along a horizontal axis as viewed in Fig. 2 under the control of the spring means 19 (see Fig. 12) comprising a pair of axially spaced helical springs 52 and 53. These springs surround the plunger 51 in engagement with annular shoulders 51a and 51b of the plunger and with end closures 54 and 55 screwed into the housing 50. The springs also engage annular shoulders 50a and 50b formed in the housing 50.

The housing 50 includes a number of cavities which cooperate with grooves formed in the plunger 51 to control the passage of pressure fluid from the pump P1 to the boom cylinder 12. For this purpose the housing 50 includes from left to right in Fig. 2 a drain cavity 58, a cylinder cavity 59 and a pressure cavity 60. These cavities are located at the left hand side of the housing 50 as viewed in Fig. 2. The housing 50 also includes a cavity 61 which may communicate with a conduit which leads either to drain or to another valve body. For example, the cavity 61 may connect with the conduit 49 if the valve is utilized in the manner of the swing valve 22. The housing 50 includes further a pressure cavity 62, a cylinder cavity 63 and a drain cavity 64 located at the right hand side of the housing 50 as viewed in Fig. 2.

The cavities 58 through 64 cooperate with a plurality of sets of grooves 65, 66, 67 and 68 formed in the plunger 51. Each set of grooves, for example the grooves 65, are spaced angularly about the axis of the plunger with all of the sets of grooves being spaced longitudinally of such axis.

The several cavities in the housing 50 communicate with conduits which lead to the boom cylinder 12, the pump P1 and drain. The drain cavities 58 and 64 communicate respectively with drain passages 69 and 70 which in turn communicate with a drain conduit 71 connected to the housing 50 at the top thereof, as shown in Figs. 2 and 3. The cylinder cavities 59 and 63 communicate respectively through passages 72 and 73 with the conduits 17 and 18 which lead to the cylinder 12 and which are connected to the housing 50 at its top as viewed in Fig. 2. Relief valves 74 and 75 are responsive to fluid pressure in the passages 72 and 73 to permit drainage of fluid from passages 72 and 73 through a passage 76 to the conduit 71 upon the occurrence of excessive pressure. The pressure cavities 60 and 62 communicate with conduits 77 and 78 which are attached to the body 50 at its opposite ends as shown in Figs. 3 and 5 and which are connected to the conduit 15.

In operation, if it is desired to extend the boom section 8 outwardly of the section 7 the plunger 51 is shifted from its illustrated neutral position to the right as viewed in Fig. 2. Such movement of the plunger is effective to place the cylinder cavity 63 in communication with the drain cavity 64 through the grooves 68 whereby fluid from the upper portion of the cylinder 12 will flow through the conduit 18, the passages 76 and 73, the cavity 63, and the grooves 68 to the drain cavity 64 which communicates with the drain pipe 71. At the same time the pressure cavity 60 is placed in communication with the cylinder cavity 59 through the grooves 65, whereby pressure fluid from the pump P1 may flow to the cylinder 12 through the conduit 15, the conduit 77, the cavity 60, the grooves 65, the cavity 59, the passages 72 and 76 and the conduit 17. It is apparent that when the plunger 51 is shifted to the left, from its neutral position as viewed in Fig. 2, pressure fluid will be supplied from the pump P1 through the cavity 62, the grooves 68, the cavity 63 and the conduit 18. In addition, fluid will be drained from the lower portion of the cylinder 12 through the conduit 17, the cavity 59, the grooves 65, the cavity 58, and the conduit 71.

When the plunger 51 is in its illustrated neutral position the pressure cavities 60 and 62 communicate with the central cavity 61 through the grooves 66 and 67. This allows pressure fluid to flow into the cavity 61 and then either to a drain conduit or to a conduit such as the conduit 49 in Fig. 12.

The details of construction of the diversion valve 37 may now be described. In the embodiment illustrated in Figs. 6, 7 and 8, the valve 37 includes a housing 81 having a plurality of cavities 82, 83, 84 and 85 and as shown in Fig. 8, these cavities are spaced longitudinally of the body 81. A cylindrical plunger 86 is slidably positioned within a longitudinally extending bore of the housing and is formed with a plurality of grooves 87 spaced angularly about the axis of the plunger which cooperate with the cavities 82, 83, 84 and 85.

The plunger 86 is shiftable longitudinally relative to the housing under the control of an elongated helical spring 88 which is positioned within the hollow of a hollow housing 89 secured to a cap 90 which is threadably connected to one end of the housing 81. The spring extends through a bore formed in the cap 90 and is seated within a conical cavity formed in one end of the plunger 86. The other end of the spring engages a suitable closure arrangement positioned at the outer end of the housing 89, as will be described hereinafter.

An additional cap 91 is threadably secured to the housing at its other end and includes parallel extending bores in which are slidably positioned cylindrical plungers 92 and 93 which engage the left hand surface of the plunger 86 and which have end portions extending into bores 94 and 95 which threadably receive conduits P1C and P2C which, as diagrammatically illustrated in Fig. 12, are connected respectively to the conduits 15 and 23 which lead to the pumps P1 and P2. The body 81 includes also a bore 96 which connects the cavity 82 and the cavity 85 to permit the drainage of any fluid entering the cavity 82 through the bores which contain the plungers 92 and 93. The cavity 85 communicates with a conduit 97 which leads to drain.

The housing 89 is closed at its outer end by a cap 98 which is screwed into the bore of the housing 89. The cap 98 is formed with a bore which threadably receives a bolt 99 having at its inner end a recess in which is positioned a projection of a plate 100 located within the bore of the housing 89 and engaging the right hand end of the spring 88. The bolt 99 is adjustable longitudinally of the housing 89 when rotated so as to vary compression of the spring 88 as desired, and a lock nut 101 maintains the bolt 99 in an adjusted position.

The pressure exerted by the spring 88 on the plunger 86 is selected so that the plunger 86 is urged to its extreme right hand position as viewed in Fig. 8 into engagement with the cap 90 when the engine E is operating under normal load conditions and the pumps P1 and P2 are producing normal pressures. These pressures are exerted upon the left hand ends of the plungers 92 and 93 by means of fluid passing through the conduits P1C and P2C into the bores 94 and 95 to engage the left hand ends of the plungers 92 and 93. For this condition it is noted that the grooves 87 are positioned to connect the cavity 84, which leads to the conduit 40, with the cavity 85 which leads to the drain conduit 97. When the plunger 86 is so positioned fluid from the tilt valve 30 passes through the conduit 40 if the valve 30 is in neutral and is conducted through the cavity 84, and the grooves 87 to the drain conduit 97.

In the event that the pump P1 alone or the pumps P1 and P2 together cannot supply the power requirements of the motor including the cylinder 12 and the piston 13 then the load under which the engine E is operating is reduced to thereby effect a decrease in the pressures of the pumps P1 and P2. This may be explained by considering that when the pump P1 alone, or the pumps P1 and P2 together, initially supply fluid to the motor including the cylinder 12 and the piston 13, the pump pressure builds up until the piston 13 begins to move relative to the cylinder 12. When this movement starts the pump cannot supply sufficient volume of fluid to maintain the pressure on the piston, and the pump pressure is therefore reduced. As a result, the pressures exerted upon the left hand ends of the plungers 92 and 93 are also reduced, whereby the plunger 86 is urged toward the left as viewed in Fig. 8 to its illustrated position from its extreme right hand position so that the grooves 87 connect the conduits 40 and 41 through the cavities 83 and 84. This allows pressure fluid to flow from the pump P3 through the valve 30 if in a neutral condition, the conduit 40, the valve 37 and the conduit 41 to the cylinder 12 through the selected one of the conduits 46 and 47. The additional fluid thus supplied is effective to increase the speed of telescopic movement of the piston 13 relative to the cylinder 12.

In Figs. 9, 10 and 11 there is illustrated a construction of the diversion valve 37 which differs from the construction illustrated in Figs. 6, 7 and 8. In Figs. 9, 10 and 11 the valve is shown as including a housing 102 having a number of longitudinally spaced cavities 103, 104, 105 and 106. These cavities cooperate with grooves 108 formed on a cylindrical plunger 107 which is positioned for sliding movement within a longitudinally extending bore of the housing 102. The plunger 107 is urged toward the left as viewed in Fig. 11 by an elongated helical spring 109 positioned within a bore formed in a spring housing 110. The housing 110 is threadably secured to an end cap 111 which may be threadably connected to the housing 102. The housing 110 is closed at its right hand end by a cap 112 against which the right hand end of the spring 109 bears.

An end cap 113 is threadably attached to the housing 102 and includes a longitudinally extending bore within which is slidably positioned a rod 114 having an enlarged end section 115 which bears against the left hand end of the plunger 107. The end section 115 is positioned within the cavity 103 and has an annular shoulder 115a which engages the cap 113 when the rod 114 is in its extreme left hand position as shown in Fig. 11. The section 115 has integrally attached thereto a reduced intermediate section 116 which in turn is integrally attached to a still smaller section 117 which extends into a bore section 118 communicating with the exterior of the cap 113. The conduit P2C is threadably attached to the cap 113 to extend within the bore section 118.

The section 117 of the rod 114 extends through a bore section 119 which communicates with a transverse bore 120 into which the conduit P1C extends. Pressure fluid is conducted through the conduit P1C into the bore section 119 to engage an annular shoulder 121 of the intermediate section 116 of the rod 114. Pressure fluid is also conducted from the pump P2 through the conduit P2C into the bore section 118 to engage the end surface of the section 117 of the rod 114.

The operation of the diversion valve just described is the same as that illustrated in Figs. 6, 7 and 8. In brief, the plunger 107 is balanced by pressure exerted thereon by the spring 109 and by pressure fluid from the conduits P1C and P2C engaging the shoulder 121 and the end surface of the section 117. The spring pressure is selected so that the plunger 107 is urged to its extreme right hand position wherein the right hand end of the plunger engages the cap 111 when the engine E is operating under normal load and the pressures of the pumps P1 and P2 have normal values. When the plunger 107 is in this position the grooves 108 connect the cavities 105 and 106 so that the fluid introduced into the cavity 105 through the conduit 40 is conducted to the drain conduit 97.

When the pressures of the pumps P1 and P2 are reduced as a result of a reduced load on the engine caused by the inability of the pump P1 alone or the pumps P1 and P2 together to supply the power requirements, the pressure of the fluid entering the bore sections 118 and 119 is correspondingly reduced and the plunger 107 is urged toward the left to its position illustrated in Fig. 11 by expansion of the spring 109. When this occurs the grooves 108 connect the cavities 104 and 105 so that fluid from the conduit 40 is conducted into the conduit 41 and thence to the cylinder 12 through the selected ones of the conduits 46 and 47.

The cavity 103 is connected to drain through a passage 122 so that any fluid entering the bore sections containing the rod sections 116 and 117 from the conduits P1C and P2C will be conducted to the cavity 103 and thence to drain.

Although the invention has been described with reference to certain specific embodiments thereof, numerous modifications are possible and it is desired to cover all modifications falling within the spirit and scope of the appended claims.

Having described my invention, I claim:

1. In a hydraulic system, a plurality of sources of pressure fluid, a plurality of fluid actuated devices each actuated from a separate one of said sources, first means actuatable automatically to direct fluid to one of said devices from a source other than the source for said one of said devices when the pressure of the source for said one of said devices decreases to a preselected value, and second means effective to prevent the direction of fluid from said first means to said one of said devices when said other source is supplying fluid to its fluid actuated device.

2. A system as defined in claim 1 wherein said means includes a control valve controlling the direction of fluid from said other source to said one of said devices, said control valve having a valve body shiftable in response to a preselected pressure condition of the source for said one of said devices.

3. A system as defined in claim 1 wherein said means includes a control valve controlling the direction of fluid from said other source to said one of said devices, said control valve having a valve body shiftable between a first position permitting the supply of fluid and a second position preventing the direction of fluid, resilient means urging the body toward the first position, and plunger means engageable by fluid from the source for said one of said devices for urging the body toward the second position.

4. In a hydraulic control system, a plurality of sources of pressure fluid, a plurality of fluid actuated devices, a plurality of valve means controlling the flow of fluid from said sources to said fluid actuated devices, each of said valve means being actuatable to establish a plurality of operating conditions of its fluid actuated device including a neutral condition, and a control valve receiving fluid from one of said valve means for controlling the flow of the received fluid to one of said devices from a source other than the source for said one of said devices, said control valve receiving fluid from said one of said valve means only when said one of said valve means is in a neutral condition, said control valve being actuatable automatically to direct the received fluid to said one of said devices when the source for said one of said devices is incapable of supplying sufficient pressure fluid to actuate said one of said devices at a predetermined speed.

5. A system as defined in claim 4 wherein another one of said valve means directs fluid to said one of said devices only when said another of said valve means is in its neutral condition.

6. A system as defined in claim 4 wherein said control valve includes a shiftable body shiftable to divert fluid upon the occurrence of a preselected pressure condition of the source for said one of said devices.

7. In a hydraulic control system, a plurality of sources of pressure fluid, a plurality of fluid actuated devices, a plurality of valve means controlling the flow of fluid from said sources to said fluid actuated devices, each of said valve means being actuatable to establish a plurality of operating conditions of its fluid actuated device including a neutral condition, a first control valve receiving fluid from one of said valve means for controlling the flow of the received fluid to one of said devices from a source other than the source for said one of said devices, said first control valve receiving fluid from said one of said valve means only when said one of said valve means is in a neutral condition, said first control valve being actuatable automatically to direct the received fluid to said one of said devices when the source for said one of said devices is incapable of supplying sufficient pressure fluid to actuate said one of said devices at a predetermined speed, and a second control valve receiving fluid from said first control valve and from another one of said valve means, said second control valve being actuatable with the valve means for said one of said devices to direct the supply of its received fluid to said one of said devices, said second control valve receiving fluid from said another one of said valve means only when said another one of said valve means is in a neutral condition.

8. A system as defined in claim 7 wherein said first control valve includes a shiftable body shiftable to direct fluid to said second control valve in response to preselected pressure conditions of the source for said one of said devices and the source associated with said another one of said valve means.

9. In a hydraulic system, a plurality of sources of pressure fluid, a plurality of fluid actuated devices each actuated from a separate one of said sources, first means actuatable to direct fluid to one of said devices from a first source other than the source for said one of said devices, said first means being ineffective to direct fluid from said first source when the first source is actuating its device, and second means actuatable to direct fluid to said one of said devices from a second source other than said first source and other than the source for said one of said devices, said second means being ineffective to direct fluid from said second source when the second source is actuating its device, said second means being actuatable automatically to direct fluid from said second source when the source for said one of said devices and said first source are incapable of supplying sufficient pressure fluid to actuate said one of said devices at a predetermined speed.

10. In a hydraulic control system, a plurality of sources of pressure fluid, a plurality of fluid actuated devices, a plurality of valve means controlling the flow of fluid from said sources to said fluid actuated devices, each of said valve means being actuatable to establish a plurality of operating conditions of its device including a neutral condition, one of said valve means directing fluid to one of said devices from a first source other than the source for said one of said devices, said one of said valve means directing fluid to said one of said devices only when in a neutral condition, and a control valve for controlling the flow of fluid to said one of said devices from another one of said valve means which is associated with a second source other than the source for said one of said devices, said another one of said valve means directing fluid to said control valve only when in a neutral condition, said control valve being actuatable automatically in response to predetermined pressure conditions of the source for said one of said devices and the first source to direct fluid to said one of said devices.

11. A system as defined in claim 10 wherein said control valve includes a valve body shiftable between a first position permitting the direction of fluid and a second position preventing the direction of fluid, resilient means urging the body toward the first position, and plunger means engageable by fluid from the source for said one of said devices and said first source for urging the body toward the second position.

References Cited in the file of this patent

UNITED STATES PATENTS

| | | |
|---|---|---|
| 2,541,045 | Ferwerda et al. | Feb. 13, 1951 |
| 2,643,516 | Carlson | June 30, 1953 |
| 2,674,854 | Church | Apr. 13, 1954 |
| 2,745,253 | Towler et al. | May 15, 1956 |
| 2,797,551 | Adams et al. | July 2, 1957 |